United States Patent Office 3,626,665
Patented Dec. 14, 1971

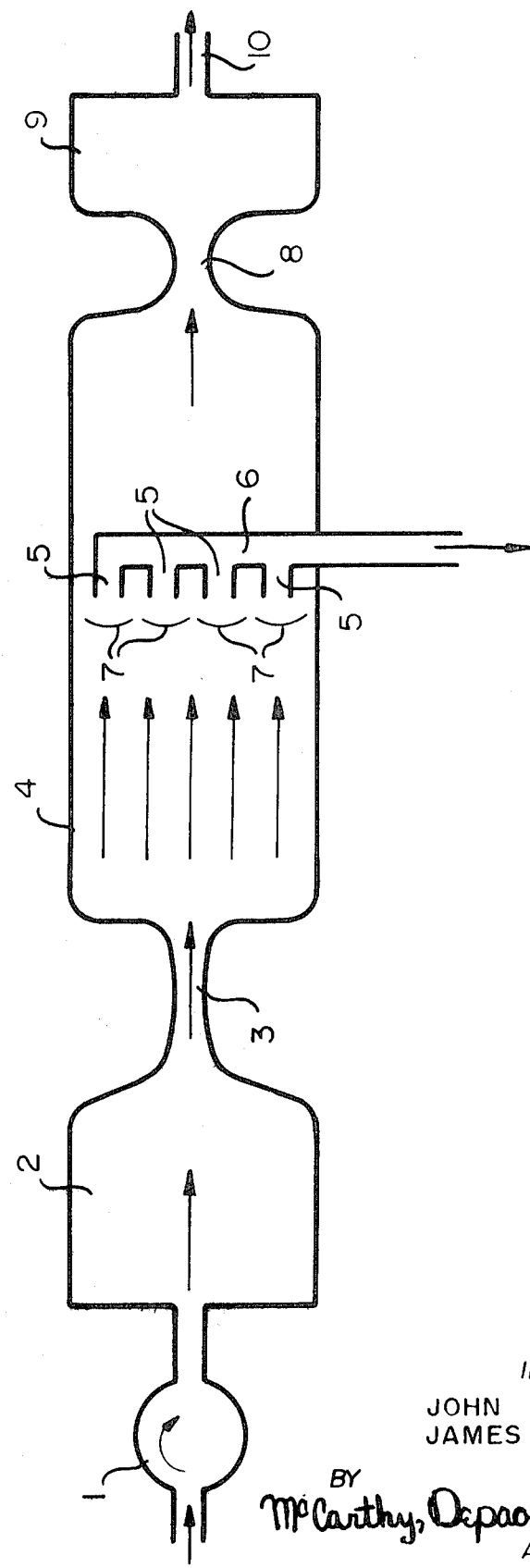

3,626,665
PROCESS FOR SEPARATING URANIUM ISOTOPES
John B. Fenn, Branford, Conn., and James R. White, Princeton, N.J., assignors to Mobil Oil Corporation
Filed Aug. 29, 1969, Ser. No. 854,245
Int. Cl. B01d 57/00
U.S. Cl. 55—17
6 Claims

ABSTRACT OF THE DISCLOSURE

Uranium isotopes can be separated utilizing shock separation techniques by introducing gaseous uranium hexafluoride, alone or in admixture with inert gaseous diluents, at supersonic velocity into a duct such that parallel flow streamlines are present; placing within the supersonic parallel flow stream a plurality of hollow probes having critical dimensions relative to the mean free path of said flow stream in front of said probes so as to cause a detached stationary shock to form ahead of each of said probes leading edges and regulating the flow through the probes in relation to the flow through the duct such that the maximum amount of separative work is accomplished. This maximization of separative work does not occur either at the highest enrichment of the heavier isotope in the sampling probes or at the highest feasible withdrawal rate of gas through said probes but only at a narrow range of critical parameters.

CROSS REFERENCE TO RELATED APPLICATIONS

This application is concerned with an improvement over the processes disclosed and claimed in copending application Ser. No. 725,578, filed Apr. 19, 1968, and now U.S. Patent No. 3,465,500 which, in turn, is a continuation-in-part of Ser. No. 272,592, filed Apr. 12, 1963, and now abandoned.

BACKGROUND OF THE INVENTION

(1) Field of the invention

This invention relates to a process for separating the components of a mixture of gases including relatively light and heavy species and, more particularly, to a process for separating uranium isotopes, i.e., $U^{235}F_6$ from $U^{238}F_6$. This invention is concerned with providing a process which is extremely efficient in regards to maximizing the total amount of separative work which can be accomplished in a system employing shock separation techniques in relation to the total amount of energy spent to accomplish said work.

(2) Description of the prior art

The problems involved in the separation of the various components of gaseous mixtures and, in particular; the separation of gaseous uranium isotopes, have been the subject of much attention for many years. Many solutions have heretofore been proposed for accomplishing the desired separation including differential diffusion through porous barriers; differential absorption; partial or complete liquefaction of one component; liquefaction of the entire mixture followed by fractional distillation or rectification; producing a supersonic jet of the gaseous mixture and placing a sampling probe on the axis of said jet and the like. Although each one of the above methods has had some degree of success, nevertheless, in general, these methods have proved costly.

A dramatic breakthrough in this field is disclosed and claimed in copending application Ser. No. 725,578, filed Apr. 19, 1968, wherein a completely new and different scientific principle is utilized in effecting the separation of the components of a gas containing both light and heavy species. Briefly, said application is concerned with shock separation and comprises accelerating a gaseous mixture containing heavier and lighter species to form a stream flowing at supersonic velocity, placing a plurality of hollow probes throughout a traverse cross section of said stream, forming a shock wave in front of the leading edges of each of said probes whereby the heavier species flows into the probes and the lighter species is deflected so that it flows around the probes, maintaining reduced pressure within the probes and withdrawing gas enriched in the heavier species from the probes.

DESCRIPTION OF THE INVENTION

It has now been discovered that a very effective and efficient process for the separation of uranium isotopes can be obtained based upon the basic shock separation technique disclosed in said copending application Ser. No. 725,578, but modified by the introduction into said process of several critical parameters. In other words, this invention is concerned with an improvement over the aforementioned shock separation process and the specific adaptation of the same to the separation of uranium isotopes.

It should be immediately realized that there is a vast difference between providing a separation process which will maximize the enrichment of either a heavier or lighter component of a gaseous mixture and providing a process which will accomplish the same in an efficient manner with respect to the total amount of energy expended. Thus, by way of considerable oversimplification, it has been found that the most efficient separation process does not reside in that situation where the maximum enrichment of heavier species is withdrawn from the sampling probes in a shock separation process. Additionally, it has also been discovered that the most efficient operation also does not reside in that situation wherein one has the greatest feasible gas flow through said probes. This invention is concerned with balancing the flow through said probes in relation to the flow around said probes in such a manner that the efficiency of an overall separation process becomes maximized.

The difficulties in maximizing the efficiency of a gaseous shock separation process involving uranium isotopes stems from the fact that by far the most significant amount of energy which must be spent is that energy required to pump and repump the desired gas to the supersonic velocities necessary in carrying out such as process.

In this connection, reference is made to the figure which represents an illustration of a shock separation process which can be carried out in accordance with this instant invention.

In said figure a gas-indicated by the arrows is introduced into compressor 1 where it is compressed and passed into volume 2 and thereafter passed through a convergent/divergent nozzle 3 wherein the gas is expanded to supersonic velocity and introduced into an elongated duct 4. Across the transverse cross section of said duct there are placed in a plurality of hollow probes 5 which are interconnected to a manifold 6 which is, in turn, connected to a pump (not shown). A reduced pressure is maintained in the manifold 6 and a standing shock wave 7 is formed in front of each probe. The heavier gas richer in $U^{238}$ enters into probes 5 and is withdrawn through manifold 6 whereas the gas richer in $U^{235}$ flows around the probes, passes through a second convergent/divergent nozzle 8 where it is compressed to a somewhat higher temperature and pressure into area 9 and leaves the duct through line 10.

The above figure represents a single stage in a separation process and actually there will be a plurality or cascade of such separation stages in order to accomplish effective separation, i.e., the material coming out of line 6 would be recompressed and introduced into another duct such as 4 and the material coming out of line 10 would be similarly compressed and reintroduced into still another duct such as 4.

It has now been found that the pumping work that must be done in a shock separation stage per unit of separative work that is performed is governed by approximately the following relation:

$$\frac{2RT\left[\theta \ln \frac{P_i}{P_t} + (1-\theta) \ln \frac{P_i}{P_h}\right]}{X(\alpha-1)^2\theta(1-\theta)}$$

wherein R is the standard gas constant and T is a temperature whose value is dependent upon the particular gas, $\alpha$ is the ratio of $U^{235}F_6/U^{238}F_6$ present in the reconverged stream at the end of the duct (volume 8 of FIG. 1) divided by the ratio of $U^{235}F_6/U^{238}F_6$ in the stream withdrawn from the probes (manifold 6 of the figure), $\theta$ is the ratio of total $UF_6$ flow downstream of probes to total $UF_6$ flow upstream of probes, $P_i$ is the initial pressure of gas mixture before passing through the convergent/divergent nozzle (area 2 of the figure); $P_h$ is the pressure of the gas after it passes through the second convergent/divergent nozzle (volume 9 of the figure) and $P_t$ is the pressure from which the mixture enriched in the heavier isotope withdrawn from the probes must be recompressed in order to enter the next stage. $\theta$ is the ratio of total gas flow downstream of the probes to total gas flow upstream of the probes and X is the mole fraction of $UF_6$ in the initial gas mixture before passing through the convergent/divergent nozzle.

The most efficient process for the separation of uranium isotopes occurs when the above expression is at a minimum, i.e., the pumping work is minimized per unit of separative work.

Irrespective of the above theoretical considerations, it has been found that a very practical and efficient process for the separation of the uranium isotopes can be obtained if certain critical parameters are carefully followed in a shock separation process.

Consider at the outset, according to the novel process of this invention, that gases containing essentially uranium hexafluorideisotopes, are compressed until it has a pressure ranging from 2 to 30 p.s.i.a. and a temperature of from about 150 to 500° F. This uranium hexafluoride is then passed through a convergent/divergent nozzle so that it leaves the nozzle at a velocity of from about Mach 2 to about Mach 5, a pressure of from 0.001 to 0.1 p.s.i.a. and a temperature of about 75–150° F. Thus uranium hexafluoride is then passed through a duct such that substantially only parallel flow streamlines are obtained. This condition is met when said uranium hexafluoride stream flows in a duct and completely fills said duct.

Across a transverse cross section of the duct is placed a plurality of hollow sampling probes which are spaced sufficiently far apart that the standing shock formed in front of one probe does not interfere with the standing shock formed in front of another probe. It has been found that this condition can be met when the probes are at least as far apart as a distance equal to the characteristic dimension of the upstream end of one of the probes.

It is known that the separation obtained in a shock process depends among other factors upon the characteristic dimension of the front end of the probes. If each probe is a cylindrical tube the characteristic dimension is the diameter of the tube. If the front end of the probe is a slot then the width at the leading edge is the characteristic dimension. It has been found that for a gas containing essentially uranium hexafluoride isotopes in order to obtain a process wherein the separative work can be maximized it is necessary that the ratio of the mean free path in the supersonic stream upstream of the shocks to the characteristic dimension based on the probe's leading edge, i.e. the Knudsen number should be from .001 to 1.0 and preferably 0.01 to 0.1.

It has also been found that the total area of the openings in the hollow slots or probes must be equal to from about 0.1 to about 0.5 of the total cross sectional area of the duct in which they are placed.

Another critical parameter resides in the fact that the gas which passes around the probes must be passed through another convergent/divergent nozzle such that this gas is compressed to a pressure of from about 1 to about 10 p.s.i.a. and has a temperature of from about 150 to 500° F.

It has also been found that the value, $\theta$, previously referred to, i.e., the ratio of the total uranium hexafluoride flow downstream of the probes to the total uranium hexafluoride flow upstream of the probes must be maintained from 0.75 to 0.95. This parameter is of the utmost importance in obtaining a process wherein the maximum amount of separative work is accomplished. If the value of $\theta$ is not maintained within the above specified limits, separation of isotopes can indeed be accomplished but not in the efficient and desired manner of this invention.

The method by which the above value of $\theta$ can be accomplished is any convenient manner, although it is preferred to attach a pump to the manifold connecting the probe and to regulate the flow through the probes such that the above-recited values for $\theta$ will be obtained.

As has previously been pointed out in order to obtain a commercial process, it is necessary that there be a cascade of separation stages each functioning in the manner above described. Thus, the fraction of a gas stream enriched in the heavier uranium isotope would be recompressed and fed to an additional separation stage and the fraction of the gas stream enriched in the lighter fraction would be similarly treated.

The following example will now illustrate the mode contemplated for carrying out this invention when the gas contains essentially $UF_6$ isotopes.

EXAMPLE

A mixture containing 0.700 part of $U^{235}F_6$ and 99.300 parts of $U^{238}F_6$ is compressed so that it has a temperature of 300° F. and a pressure of 7.5 p.s.i.a. This material is then passed in the manner described in the figure through a convergent/divergent nozzle such that it has a velocity of about Mach 4, a pressure of about 0.02 p.s.i.a., and a temperature of about 75° F. The gas, travelling at supersonic velocities, passes through an elongated tubular duct, completely fills said duct so that there exist parallel flow lines. Probes comprising a plurality of knife edge slots of about 1 to 2 mm. between edges are spaced across the transverse cross section of the duct. Under these conditions the Knudsen number of the flow referred to the slot edge-to-edge dimension is maintained at approximately 0.01.

The total open area of said probes facing in the upstream direction is about 0.5 of the total cross section of said elongated tubular duct.

A reduced pressure is maintained in the probes by means of a pump and a fraction of $UF_6$ is withdrawn. The fraction is enriched in $U^{238}$ and analyses about 99.306 parts by weight of $U^{238}F_6$ and about 0.694 part by weight of $U^{235}F_6$. This withdrawn fraction has a pressure of about 0.3 p.s.i.a. and a temperature of about 300° F. It is preferably recompressed and fed to another separation stage.

The fraction of $UF_6$ flowing around the probes is passed through a convergent/divergent nozzle so that it has a pressure of about 2.0 p.s.i.a. and a temperature of 300° F. It contains about 0.702 part of $U^{235}F_6$ and about 99.298 parts of $U^{238}F_6$.

This fraction enriched in lighter isotope is preferably recompressed and passed through other similar separation stages.

By any suitable means, such as insertion of a throttling valve into the pump which is connected to the probes, the amount of uranium hexafluoride which is withdrawn from the probes is carefully regulated such that the ratio of the total uranium hexafluoride flow downstream of the probes to the total uranium hexafluoride flow upstream of the probes is about 0.75.

The above example illustrates the novel process of this invention in that a method is disclosed for the separation of uranium isotopes by a process involving shock separation wherein the energy necessary to perform a unit of separative work is kept at a minimum.

What is claimed is:

1. A process of separating uranium isotopes from a gaseous mixture containing the same which comprises:
    (a) accelerating said mixture containing uranium isotope gases through a nozzle into a duct such that it forms a stream that emerges at supersonic speed and expands to have a Mach number of from 2 to about 5, a temperature of about 75–150° F. and a pressure from about 0.001 to 0.1 p.s.i.a.;
    (b) placing an array of hollow probes in the supersonic stream at a sufficient distance from said nozzle to cause a detached stationary shock to form ahead of each probe's leading edges, all of said probes being disposed entirely within the supersonic portion of said stream and said stream completely filling said duct, all of said probes having axes which are separate and distinct from each other and which are located in different transverse portions of said stream and the total area of the openings facing upstream said probes being from about 0.1 to about 0.5 of the total area of said duct;
    (c) selecting the distance between opposite leading outside edges of said probes relative to the mean free path in the free stream of gas ahead of said probes such that the combination has a Knudsen number between 0.001 and 1.0;
    (d) maintaining a relatively low pressure in the interior of said probes;
    (e) whereby the effect of the detached stationary shocks causes a lesser deceleration of said heavier uranium isotope than of said lighter uranium isotope of said mixture and thus results in an increased relative concentration of said heavier isotope within said probes;
    (f) continuously withdrawing a portion of the gas stream through said probes enriched in said heavier isotope; and
    (g) regulating the amount of gas withdrawn from said probes such that the ratio of the uranium isotope gas flow downstream from the probes to the uranium isotope gas flow upstream of the probes is from 0.75 to 0.95.

2. The process of claim 1 wherein the gaseous mixture comprises $U^{235}F_6$ and $U^{238}F_6$.

3. The process of claim 1 wherein the gaseous mixture which does not flow through said probes is passed through a convergent/divergent nozzle wherein it exits at a pressure of from about 1 to about 10 p.s.i.a. and a temperature of from about 150–500° F.

4. The process of claim 1 wherein a cascade of separation stages are employed.

5. The process of claim 4 wherein said probes consist of a plurality of knife-edged members.

6. A process of separating $U^{238}F_6$ from a gaseous mixture of the same with $U^{235}F_6$ which comprises:
    (a) accelerating said mixture of uranium isotope gases through a nozzle into a duct such that it forms a stream that emerges at supersonic speed and expands to have a Mach number of from 2 to about 4, a temperature of about 75–150° F. and a pressure of from about 0.001 to 0.1 p.s.i.a.;
    (b) placing an array of hollow knife-edged probes in the supersonic stream at a sufficient distance from said nozzle to cause a detached stationary shock to form ahead of each probe's leading edges, all of said probes being disposed entirely within the supersonic portion of said stream and said stream completely filling said duct, all of said probes having axes which are separate and distinct from each other and which are located in different transverse portions of said stream and the total area of the openings facing upstream of said probes being from about 0.1 to about 0.5 of the total area of said duct;
    (c) selecting the distance between opposite leading outside edges of said probes, relative to the mean free path of the free stream of gas ahead of said probes such that the combination has a Knudsen number between 0.01 and 1.0;
    (d) maintaining a relatively low pressure in the interior of said probes;
    (e) whereby the effect of the detached stationary shock causes a lesser deceleration of said $U^{238}F_6$ than of said $U^{235}F_6$ of said mixture and thus results in an increased relative concentration of said $U^{238}F_6$ within said probes;
    (f) continuously withdrawing a portion of the gas stream through said probe enriched in said $U^{238}F_6$;
    (g) regulating the amount of gas withdrawn from said probes such that the ratio of the total uranium hexafluoride gaseous flow downstream from the probes to the total uranium hexafluoride gaseous flow upstream of the probes is from 0.75 to 0.95; and
    (h) passing the portion of said uranium hexafluoride enriched in $U^{235}F_6$ through a convergent/divergent nozzle so that it attains at a pressure of about 1–10 p.s.i.a. and a temperature of 150–500° F.

References Cited
UNITED STATES PATENTS

| | | | |
|---|---|---|---|
| 2,607,439 | 8/1952 | Dickens et al. | 55—17 |
| 3,465,500 | 9/1969 | Fenn | 55—17 |

SAMIH N. ZAHARNA, Primary Examiner

R. W. BURKS, Assistant Examiner

U.S. Cl. X.R.

55—71

UNITED STATES PATENT OFFICE
CERTIFICATE OF CORRECTION

Patent No. 3,626,665                    Dated   December 14, 1971

Inventor(s)  John B. Fenn and James R. White

It is certified that error appears in the above-identified patent and that said Letters Patent are hereby corrected as shown below:

Column 2, line 47, "as" should read --a--.

Column 3, line 10, "(1-θ)" should read --(1-θ')--.

Column 3, line 17, "FIG. 1" should read -- the Figure--.

Signed and sealed this 27th day of June 1972.

(SEAL)
Attest:

EDWARD M. FLETCHER, JR.             ROBERT GOTTSCHALK
Attesting Officer                   Commissioner of Patents